United States Patent

[11] 3,575,252

[72] Inventor Peter P. Konyha
 Brillion, Wis.
[21] Appl. No. 811,030
[22] Filed Mar. 27, 1969
[45] Patented Apr. 20, 1971
[73] Assignee Ariens Company
 Brillion, Wis.

[54] VEHICLE WITH AUXILIARY SPEED CONTROL
 6 Claims, 5 Drawing Figs.
[52] U.S. Cl. .................................................. 180/70,
 74/217
[51] Int. Cl. ....................................................... B60k 17/00
[50] Field of Search .......................................... 180/70, 70
 (MST); 74/217

[56] References Cited
UNITED STATES PATENTS

| | | | |
|---|---|---|---|
| 1,151,837 | 8/1915 | Tannewitz..................... | 74/217 |
| 2,150,456 | 3/1939 | Perrine....................... | 180/70(UXMST) |
| 2,419,850 | 4/1947 | Norton......................... | 74/217 |
| 2,510,325 | 6/1950 | Anderson...................... | 180/70 |
| 3,062,065 | 11/1962 | Shaw........................... | 74/217 |
| 3,311,186 | 3/1967 | Kamlukin...................... | 180/70 |

*Primary Examiner*—Harry A. Levy
*Attorney*—Wheeler, Wheeler, House & Clemency

ABSTRACT: In the drive from a prime mover to a transaxle, different ratios of drive pulleys are selectively available to give varying ranges for each speed for which the transaxle makes provision. High- and low-speed belts are side by side and selectively effective according to the position of a belt tightener which may be lifted from either belt and shifted to registry and engagement with the other.

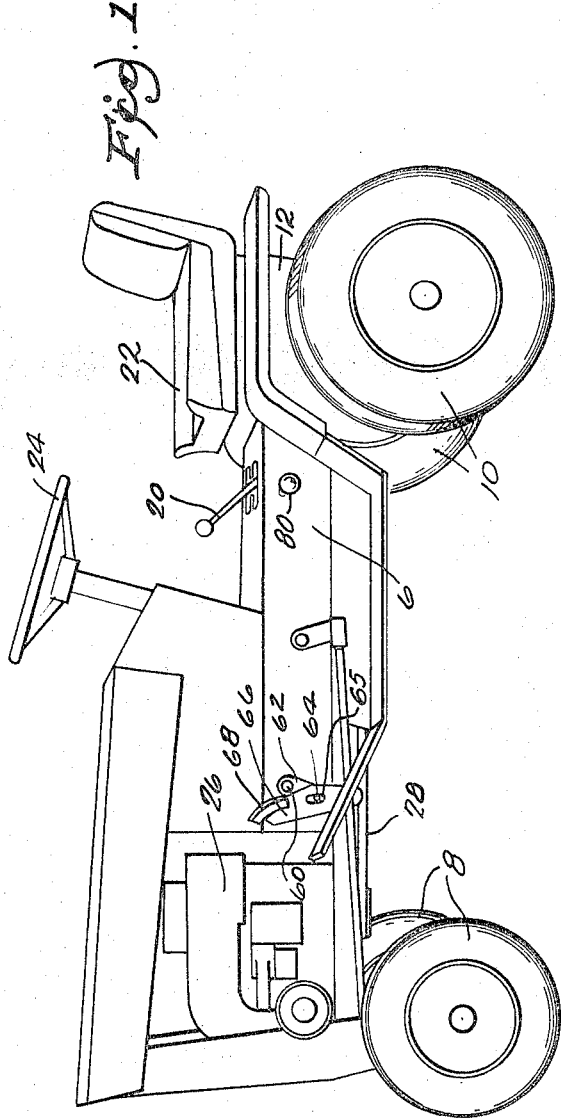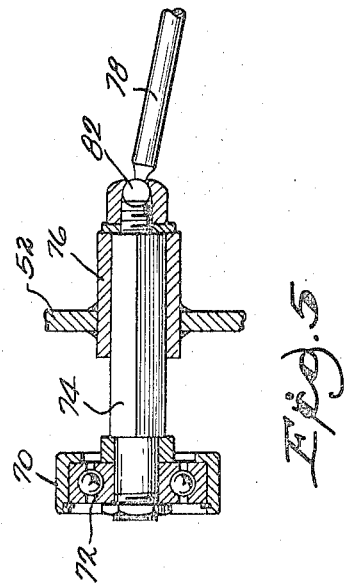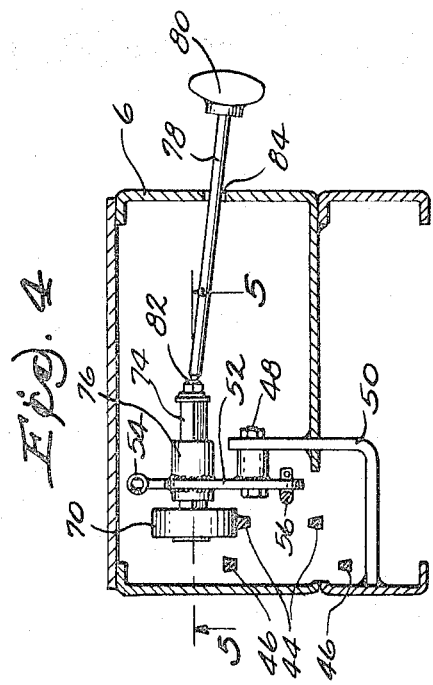

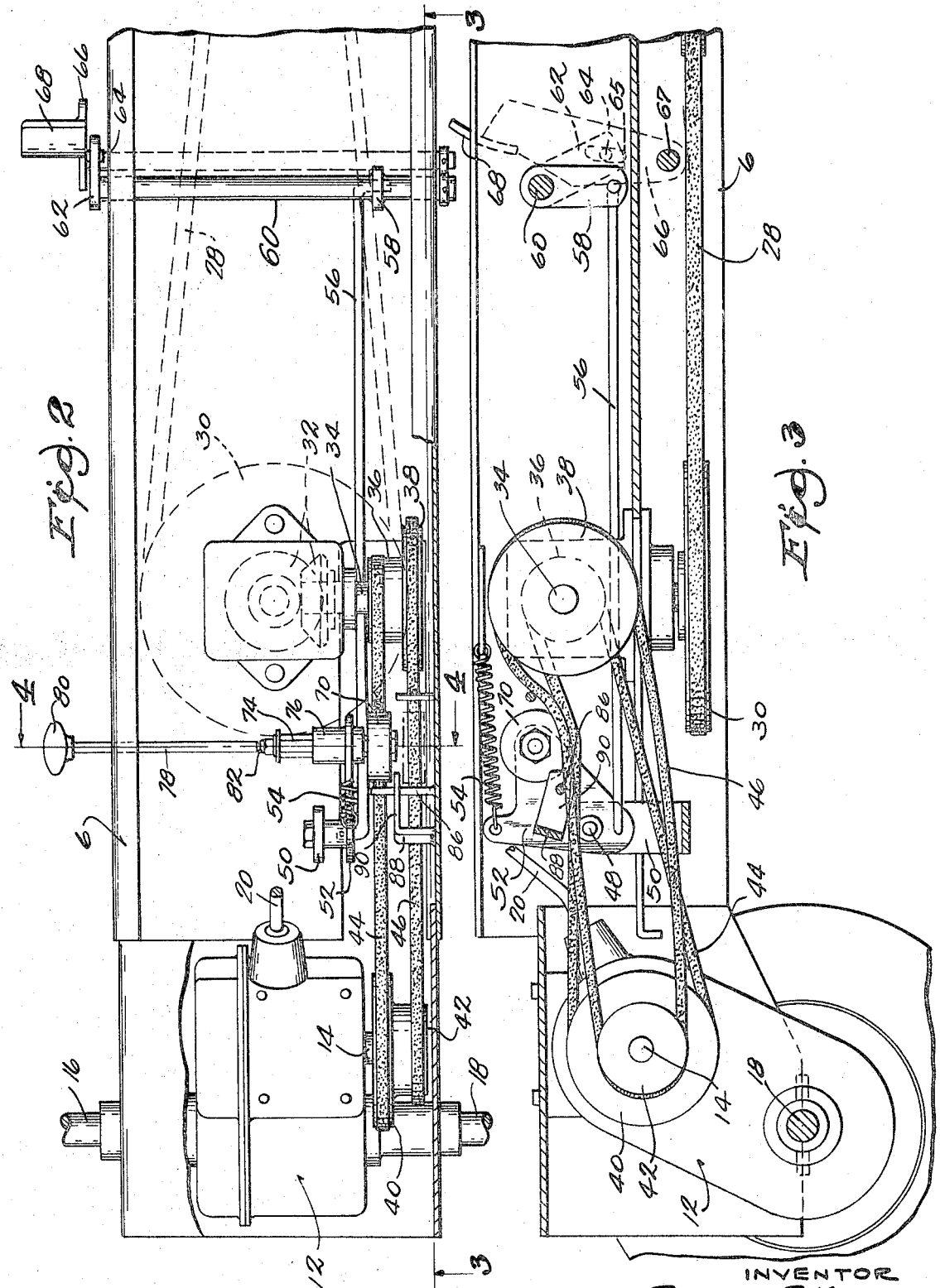

VEHICLE WITH AUXILIARY SPEED CONTROL

BACKGROUND OF THE INVENTION

The conventional transaxle provides for a number of drive ratios to the drive wheels of a vehicle but the range may not be adequate.

SUMMARY OF THE INVENTION

The drive to the transaxle is effected selectively through either of two V-belts which operate over pulleys of differing ratio. These V-belts are preferably side by side. The arrangement is such that power is transmitted only when a V-belt is tensioned by an idler. The ratio of the pulleys over which one V-belt is trained is different from that of the pulleys over which the other V-belt is trained.

At a point intermediate the driving and the driven shaft there is little difference in the level of the upper runs of the respective belts. At this level, a single idler may be engaged selectively with either belt. A spring-biased bellcrank actuates the idler in a direction to tension the belt with which it is in registry. The idler shaft is axially adjustable by a bellcrank to register the idler with the selected belt.

The equivalent of a clutch is provided by means of a foot pedal linked to the bellcrank and opposed to the bias, to lift the idler from engagement with the belt in order that it may be shifted freely from engagement with one belt to engagement with the other. A barrier between the belts requires that the idler be lifted and prevents movement horizontally directly from one belt to the other.

The difference in ratio between the belts is obviously effective upon every different speed for which the transaxle is designed. This makes it possible to have speeds in the transaxle widely spaced, and still to provide intermediate speeds for use when desired, and also to provide a very low speed, below the normal transaxle lower limits, if this is needed.

The invention is particularly applicable to a tractor having a prime mover with a vertical drive shaft but is by no means limited thereto.

BRIEF DESCRIPTION OF DRAWINGS

FIG. 1 is a side elevation of a vehicle equipped with a device embodying the present invention.

FIG. 2 is a plan view fragmentarily showing the vehicle frame as it appears with the superstructure removed and the frame turned to go in the opposite direction from that shown in FIG. 1.

FIG. 3 is a view taken on the line 3—3 of FIG. 2.

FIG. 4 (sheet 1) is a view taken on the line 4—4 of FIG. 2.

FIG. 5 (sheet 1) is an enlarged detail view on the line 5—5 of FIG. 4.

DESCRIPTION OF PREFERRED EMBODIMENT

The vehicle shown is intended particularly for use as an agricultural tractor but the invention is applicable to any vehicle having need for additional speed ratios. The vehicle frame 6 is supported on front wheels 8 and drive wheels 10, the latter having a transaxle gear housing 12 containing means for changing the ratio between the transaxle input shaft 14 and the driven shafts 16 and 18 to which the wheels 10 are attached. The shift lever 20 mounted on the transaxle housing 12 provides for the usual adjustment of the ratio of gears within the housing (not shown). A seat is provided at 22 for the operator and the front wheels 8 are steered by means of the steering wheel 24.

On the frame is the engine 26. From its drive shaft (not shown) power is transmitted by means of a belt 28 to a larger horizontal pulley 30 connected by bevel gearing at 32 with a drive shaft 34 on which pulleys 36 and 38 are mounted side by side. The parallel shaft 14 which provides the input to the transaxle 12 has pulleys 40 and 42 complementary to pulleys 36 and 38 as clearly shown in FIG. 2 and FIG. 3.

A V-belt 44 is trained over pulleys 36 and 40. V-belt 46 is trained over pulleys 38 and 42.

Pivoted by pintle 48 to a frame member 50 is a bellcrank 52 subject to the bias of the tension spring 54. Below the pintle 48 a link 56 connects the bellcrank with the arm 58 of a rock shaft 60, which has another arm 62 having pin 64 which rides in slot 65 in a lever 66 pivotally mounted on rock shaft 67 and carrying foot pedal 68.

Idler 70 is mounted on bearings 72 carried by a squared shaft 74 reciprocable through sleeve 76 of corresponding cross section, the sleeve being mounted on the bellcrank 52 as best shown in FIGS. 4 and 5. The rod 78 is provided with handle 80 and is in swiveled connection at 82 with the end of the squared shaft 74 as a means of sliding the squared shaft through the sleeve 76 to register the idler 70 selectively with belt 44 or belt 46. In FIG. 4, the idler is shown engaged with belt 44. The handle rod 78 projects through an opening 84 in the frame, where the handle 80 is readily accessible to the operator as shown in FIG. 1 and FIG. 4.

Except when the respective belts are tensioned by the idler, they do not transmit motion between the pulleys over which they are trained. When the idler is engaged with belt 44 as in FIG. 3 and FIG. 4, the drive from shaft 34 to the input shaft 14 of the transaxle occurs through pulleys 36 and 40. When the idler is engaged with belt 46 (which is shown slack in FIG. 3) motion is transmitted from shaft 34 to shaft 14 through the pulleys 38 and 42. Obviously, this gives an entirely different ratio of motion transmission into the transaxle.

There is, obviously, some difference in level of the respective belts according to whether they are under tension or free of tension. If both are free of tension, they are approximately at the same level in the location where the idler 70 is disposed for adjustment between them. To allow for any difference of level and at the same time to relieve the idler of stress at the time of adjustment, the operator simply exerts thrust on the pedal 68, whereby the link 56 oscillates the bellcrank 52 counterclockwise as viewed in FIG. 3, thereby overcoming spring 54 and lifting the idler free of belt engagement. When thus freed of stress, the idler is readily shifted from engagement with one belt to engagement with the other by simply reciprocating the rod 78 by means of handle 80.

Particularly in view of the fact that the belts yield under pressure of the idler it becomes desirable to prevent direct lateral movement of the idler from one belt toward the plane of the other. For this purpose, a rod 86 and an arm 88 projecting from the frame support a barrier plate 90 between the two belts in a position such as to require actuation of the bellcrank lever 52 to lift the idler 70 bodily from a belt with which it has been engaged before the idler can be moved into registry with the other belt, and lowered into engagement therewith.

The arrangement provides a simple and inexpensive means of enlarging the drive ratios for a vehicle such as that described. It will be understood that in some aspects the invention is not limited to use in connection with a vehicle having a transaxle as shown.

I claim:

1. The combination with a power shaft and a drive shaft, of a plurality of parallel sets of pulleys for connecting said shafts, V-belts trained over the respective pulleys and ineffective to transmit motion therebetween except when tensioned, an idler for selectively tensioning a particular V-belt, means mounting the idler for adjustment between positions of registry and engagement with respective belts for the tensioning thereof, and means for shifting the idler from registry with one belt to registry with another, said last mentioned means comprising a bellcrank, an idler support mounted on the bellcrank and upon which said idler is carried, means for adjusting the idler with reference to the bellcrank to the aforesaid positions of registry with respective belts, and means for biasing the bellcrank in a direction to engage the idler with the V-belt with which it is in registry.

2. A combination according to claim 1 in further combination with a foot pedal having a link connection with the bellcrank for the oscillation thereof against the bias of said biasing means, and a mechanical connection for the shifting of said idler between said positions.

3. A combination according to claim 2 in which the means for shifting the idler to and from V-belt engagement comprises a spring secured to said bellcrank for biasing the latter to engage the idler with the V-belt with which it is in registry.

4. A combination according to claim 3 in which said bellcrank has a bearing sleeve and the means for mounting the idler includes a shaft reciprocable through said sleeve in a direction to move said idler from registry with one belt into registry with another when said idler is disengaged from belt contact.

5. A vehicle comprising a plurality of wheels including drive wheels, an engine, a power shaft having means for actuating it from the engine, a drive shaft having means for communicating motion to the driven vehicle wheels, a first set of pulleys mounted on the power shaft, a second set of pulleys mounted on the drive shaft, said pulleys being V-pulleys arranged in pairs wherein one pulley of each pair is mounted on one of each of said shafts, V-belts trained over the pulleys of respective pairs and sufficiently loose thereon to transmit no substantial motion from the power shaft to the drive shaft except when subjected to idler pressure, an idler for exerting pressure upon a V-belt with which it is in registry, oscillatory means supporting said idler for movement to and from V-belt pressure engagement, a spring biasing said oscillatory means in a direction to press said idler into engagement with a V-belt with which it is in registry, a shaft mounting said idler for axial movement with respect to said oscillatory means, a clutch pedal having link-connection with said oscillatory means and constituting means for disengaging the idler from belt engagement in opposition to the bias of said spring, and means for axially moving the idler from registry with one V-belt into registry with another when disengaged by said clutch pedal.

6. A vehicle according to claim 5 in which said oscillatory means has a sleeve of noncircular cross section, said idler having a supporting antifriction bearing and a shaft of noncircular cross section nonrotatably mounted in and axially slidable through said sleeve and provided with means for manually shifting it axially of the idler.